United States Patent [19]

Fujimoto

[11] 4,229,987

[45] Oct. 28, 1980

[54] BICYCLE DERAILLEUR HAVING POSITIVE SPEED POSITION RETENTION

[75] Inventor: Hideaki Fujimoto, Toyonaka, Japan

[73] Assignee: Shimano Industrial Company, Limited, Osaka, Japan

[21] Appl. No.: 12,607

[22] Filed: Feb. 15, 1979

[30] Foreign Application Priority Data

Feb. 28, 1978 [JP] Japan .................................. 53-23909

[51] Int. Cl.$^2$ .......................... F16H 7/22; F16H 7/00
[52] U.S. Cl. .................................. 474/82; 280/236 D
[58] Field of Search .................. 74/217 B, 242.11 B, 74/242.14 B, 242.15 B; 280/236, 237, 238

[56] References Cited

U.S. PATENT DOCUMENTS

| | | | |
|---|---|---|---|
| 3,974,707 | 8/1976 | Nagano | 74/217 B |
| 4,030,375 | 6/1977 | Nagano | 74/217 B |
| 4,037,484 | 7/1977 | Morse | 74/217 B |
| 4,132,119 | 1/1979 | Nagano et al. | 74/217 B |

*Primary Examiner*—C. J. Husar
*Assistant Examiner*—Conrad Berman
*Attorney, Agent, or Firm*—Stevens, Davis, Miller & Mosher

[57] ABSTRACT

A four member derailleur is disclosed having a control element which includes a plurality of engageable portions corresponding to the number of speed change stages mounted to one of the four members and a retainer for engaging with or disengaging from the engageable portions to keep a movable member of the four members in a proper position. The derailleur also includes means for moving the retainer in the direction of disengaging from each of the engageable portions so that when the movable member returns, through action of a return spring, the retainer may disengage from each of the engageable portions allowing the return movement of a chain guide.

17 Claims, 7 Drawing Figures

BICYCLE DERAILLEUR HAVING POSITIVE SPEED POSITION RETENTION

This invention relates to an improvement in a derailleur for a bicycle, and, more particularly, relates to an improvement in a derailleur including four members, namely a fixing member, two linkage members and a movable member supporting a chain guide. A spring is mounted between two of the four members, so that operation of a control wire comprising an inner wire and outer sheath and action of the return spring cooperate to impart reciprocal movement to the movable member relative to the fixed member for changing the bicycle speed.

This type of derailleur is generally well-known, and is combined with two or more sprockets at a rear hub or crank of a bicycle to form a speed change system.

A modification of this type of derailleur has been proposed in U.S. Pat. No. 3,974,707 in which the derailleur has, at one of the four members, a control element having a plurality of recesses therein corresponding to the number of speed change stages and, at another of the four members which is in relative motion to the one member, a ball engageable with each of the recesses so that when both members are in relative motion the ball is moved with respect to the recesses to engage with one of the recesses and be retained at the predetermined position corresponding to the desired speed change stage.

In this arrangement, the ball, which is elastically engaged with each of the recesses in order to be kept in position, makes it impossible to return the chain guide by the action of a return spring, so that it is necessary for the chain guide to be forcibly returned by the use of two control cable systems comprising an inner wire and outer sheath or a push-pull type wire system operable in a pushing and pulling mode. Hence, when no return spring is used, the ball must be subjected to a sufficient force for disengagement from each of the recesses, thus requiring extra effort to move the control lever. In addition, the need for two control cable systems makes the construction complicated, while the push-pull wire system is too expensive, resulting in a high manufacturing cost.

On the other hand, U.S. Pat. No. 4,030,375 discloses a derailleur, having a chain guide which is moved in one direction by pulling the pull-type wire and returned in the opposite direction by action of a return spring and which has at one of the four derailleur members, a cam having notches corresponding to the number of speed change stages and, at another member in relative motion to the one member, a roller or pin selectively engageable with one of the notches, for accurately positioning the chain guide in accordance with a desired speed change stage.

With this derailleur, even if relative length of the control cable varies with respect to the inner wire, the chain guide can still be properly positioned in accordance with a desired speed change stage, but this arrangement has the following defects. First, the notches cannot keep the chain guide at the proper position, thereby requiring the provision of frictional resistance to the control lever for overcoming the return spring force which results in the need for a large force to operate the lever. Second, this type of derailleur produces noise when a driving chain is switched to a selective one of sprockets. In other words, the roller or pin moves along the cam face with respect to the notches following a pull or release of the inner wire, especially, a path of motion of the roller or pin across the border between the adjacent notches becomes a circular arc around the border. As a result, the chain guide, during switching of the chain by operating the wire, moves following the wire control without intermittence.

While there is no problem in pulling the inner wire of the control cable to forcibly move the chain guide, when the return spring acts to return the chain guide, the problem exists that the chain, when switched to a selective sprocket, contacts therewith to make noise.

This problem is somewhat removed by providing a larger return spring force to rapidly switch the chain, but the strong spring force requires that greater force be applied to the control lever for moving the chain guide against the return spring and also the noise problem is not eliminated.

This invention has been designed to overcome all these problems. An object of the invention is to provide a derailleur which can properly position and retain in position a chain guide in accordance with a desired speed change stage while using a pull-type control cable and a return spring and which does not generate noise when changing the bicycle speed, especially when the chain guide is restored by the return spring.

The derailleur of the invention includes a control element having a plurality of engageable portions corresponding to the number of the speed change stages mounted to one of the four usual derailleur members a retainer which is freely engageable with and disengable from each of the engageable portions for helping the movable member in a proper position corresponding to a desired speed change stage mounted to another member having relative movement to the one member, and means for moving the retainer in a direction causing it to be disengaged from each of the engageable portions, so that when the return spring acts to return, the movable member the retainer is allowed to disengage from one of the engaged engageable portions to restore the chain guide.

In addition, the control element and retainer are, of course, supported directly to two members in relative motion to each other. These two members selected from the four derailleur members consisting of the fixing member, two linkage members and movable member. The control element and retainer may also be supported to a pin connecting each member, or indirectly to each member through a third member fixed or pivoted thereto. The invention also is applicable to a front derailleur as well as the rear derailleur.

These and other objects of the invention will be more apparent from the description of embodiments of the invention taken in accordance with the accompanying drawings, in which.

Figure 1:
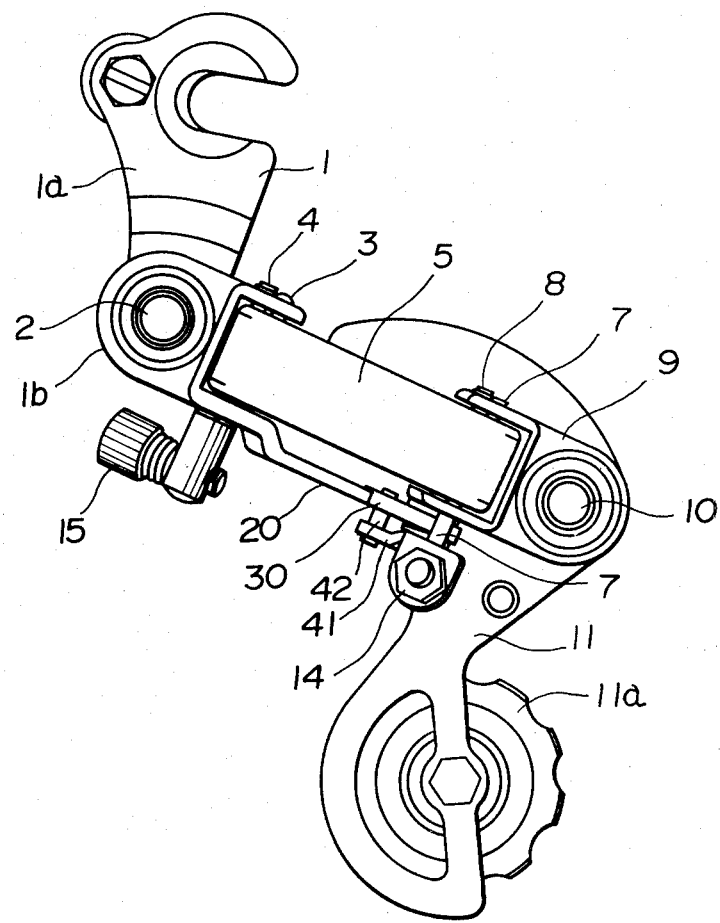
FIG. 1 is a front view of an embodiment of the derailleur of the invention.
Figure 2:
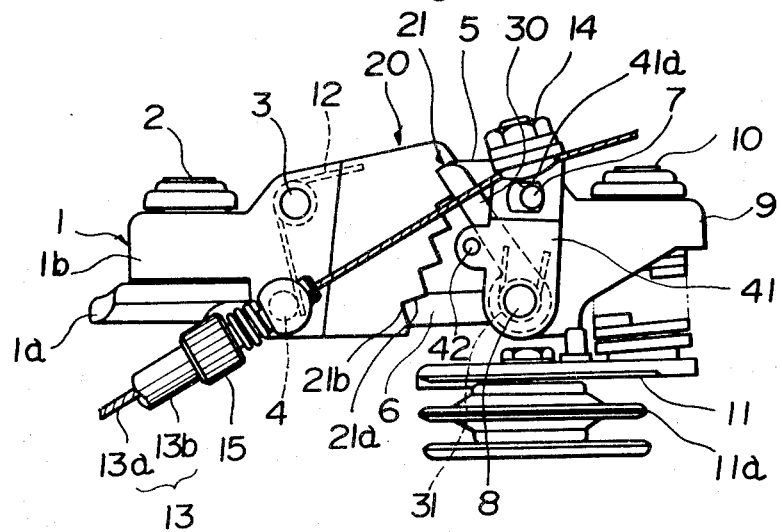
FIG. 2 is a bottom view thereof.

All the drawings represent rear derailleurs, each of which is, as shown in FIGS. 1 and 2, composed mainly of four members, namely, a fixing member 1, two parallel linkage members 5 and 6, and a movable member 9, and a return spring 12. The fixing member 1 comprises a bracket 1a fixed to a fork end (not shown) of the bicycle together with a hub shaft (not shown) and a support 1b mounted to the bracket 1a to be rotatable only in a given range. The support 1b is rotatable with respect to the bracket 1 but not-movable with respect to the movable member 9.

The support 1b also is provided at its one side with opposite sidewalls to which the two linkage members are pivoted through two pins 3 and 4 respectively.

The linkage members 5 and 6 are equal in length and of a C-like shape section respectively, and are mounted to the support 1b of the fixing member 1 oppositely to each other at each open side of the same. The movable member 9 is pivotally supported at the foremost ends of the linkage members 5 and 6 through pins 7 and 8.

The movable member 9 is formed substantially similarly to the support 1b, and has at one side thereof two opposite sidewalls pivotally supporting the linkage members 5 and 6 therebetween through pins 7 and 8 such that both the movable member 9 and the linkage members 5 and 6 are swingably movable with respect to each other. At the other side of the movable member 9 is mounted a chain guide 11 carrying two chain-guide pulleys 11a therebetween through a pivot 10 which is directed the same as the pivot 10 so that the chain guide 11 may turn around the pivot 10 only in a given range.

The chain-guide pulleys 11a serve to carry a driving chain (not shown) thereon and move in the axial direction of the multi-speed transmitting freewheel (not shown) so that the chain may be introduced from the pulley to a selected sprocket of the freewheel for engagement therewith for changing the bicycle speed.

The basic construction of the derailleur just described is not different from a well-know derailleur and the construction thereof will be fully understandable from this description.

The invention provides a positioning device described below between two relatively movable members of the just described derailleur. These two members may be the fixing member 1 and movable member 9 or either of the linkage members 5 or 6, the movable member 9 and either of the linkage members 5 or 6, or the two linkage members 5 and 6. The positioning device serves to selectively determine and simultaneously maintain a proper position where the chain guide 11 is kept during the speed-change operation. The positioning device comprises a control element 20 having a plurality of engageable portions 21 corresponding to the number of speed change stages, a retainer 30 selectively engageable with each of the engageable portions for keeping the chain guide 11 in the proper position, and moving means for forcibly moving the retainer 30 in a direction where it disengages from the engaging face 21a of each of the engageable portions 21.

The control element 20 and retainer 30 are mounted to two members of the derailleurs four members such that (1) the control element 20 is mounted to the fixing member 1 and the retainer 30 to the movable member 9 or linkage member 5 or 6, or (2) the control element 20 is mounted to the movable member 9 and the retainer 30 to the fixing member 1 or linkage member 5 or 6, or (3) the control element 20 is mounted to one of the linkage members 5 and 6 and the retainer 30 to the fixing member 1, movable member 9 or the other of the linkage members 5 and 6. Rather than being mounted directly to a derailleur member, the control 20 and retainer 30 may be supported by each two of pins 3, 4, 7 and 8, connecting each of the four derailleur members, or supported thereto indirectly through separate members mounted to the two derailleur members or to the pins.

Next, a typical embodiment of the invention will be described in accordance with the drawings. At first, an embodiment, in which the control element 20 is mounted to the fixing member 1 and the retainer 30 to the pin 8, will be described in conjunction with FIGS. 1 through 3.

In this embodiment, the control element 20 is formed as an integral of body 1b of the fixing member 1, the extension extending toward movable member 9. The extension is provided at its foremost end with five engageable portions 21 having ratchet-type teeth, and the retainer 30, which is formed in a pawl shape, is engageable with each of the engageable portions 21 and pivotally supported to the pin 8.

Each of the engageable portions 21 has an engaging face 21a engageable with the retainer 30 to keep the chain guide 11 in a proper position and a connecting face 21b connecting two adjacent engaging faces 21a. The engaging face 21a is formed in a circular arc around the pin 8 and has a length corresponding to a lever stroke of a control lever (not shown) which controls an inner wire 13a of a control cable 13 in order to change the bicycle speed.

The retainer 30 is urged by a spring 31 into engagement with a selected one of the engageable portions 21, the spring 31 being coiled onto the pin 8 and retained at one end to the movable member 9.

Figure 3:
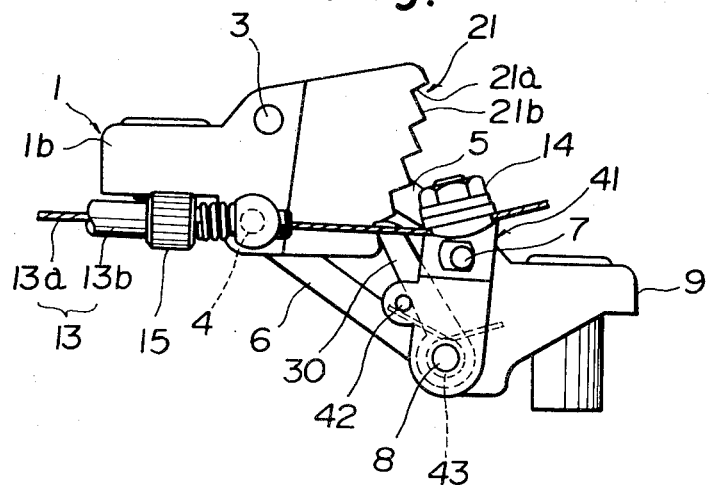
FIG. 3 is a partially omitted bottom view of the movable member in condition of moving from the position shown in FIG. 2, FIGS. 4 through 7 are partially omitted bottom views of modified embodiments of the invention corresponding to FIG. 3.

The moving means of this embodiment employs a control arm 41. The arm 41 is pivoted to the pin 8 and is swingable to an extent equal to length of the engaging face 21a. The arm 41, as shown in FIG. 3, carries at one side an engaging pin 42 engageable with one side of the retainer 30, and is urged in the direction of moving away from the engageable portions 21 by means of a spring 43 which is coiled onto the pin 8 and held at one end to the movable member 9, so that the retainer 30 may be disengaged from the engaging face 21a.

It is to be noted that the spring 43 has a greater strength than spring 31 which urges the retainer 30 toward the engageable portions 21, whereby the inner wire 13a, when released, allows the spring 43 to act to forcibly disengage the retainer 30 from each of the engageable portions 21 in engagement therewith.

Also the spring 43 has a smaller strength than the frictional resistance applied to the control lever so that when the inner wire 13a is tensile, due to the frictional resistance and action of the return spring 12, the arm 41 is inactive. In addition, the frictional resistance can be made smaller than the return spring 12 force by making the return spring 12 larger in strength than the difference obtained by subtracting the spring 31 force from the sum of the frictional resistance and the spring 43 force.

In other words, when the retainer 30 is engaged with the engageable portion 21, the wire 13a is not at all subjected to the return spring 12 force so that the frictional resistance overcomes the spring 43 force to thereby keep the engagement. On the other hand, when the retainer 30 is disengaged from the engageable portion 21, the return spring 12 which is larger in strength than the frictional resistance, causes the movable member 9 to move.

In this arrangement, various methods are available to restrict the swinging range of arm 41. A suitable method is shown in FIG. 3 wherein arm 41 has an elongate slot 41a having a length corresponding to an extent of the swinging range of arm 41, and an end of the pin 7 is inserted into the slot so that the pin 7 contacts with both lengthwise sides thereof.

The arm 41, as shown in FIGS. 1 through 3, supports the inner wire 13a, but it may support an outer sheath 13b. When the inner wire 13a is supported to the arm 41 the outer sheath 13b is supported to the fixing member 1 through a holder 15, or they are supported interchangeably.

Operation of this construction is as follows, when the control lever is operated in a given lever stroke to pull the inner wire 13a, the chain guide 11 is moved against the return spring 12 for changing the bicycle speed, for example, from the high speed stage in FIG. 2 to the low speed stage in FIG. 3. When the wire 13a is pulled, the control arm 41 swings to the end of its swinging range and moves the movable member 9, whereby the movable member 9 is forcibly moved to reach the position shown in FIG. 3. Hence, the retainer 30 carried by the control arm 41 moves together therewith in swinging motion along the engageable portion 21, thereby stepwise changing the position of selective engagement between the retainer 30 and the engageable portions 21.

Upon cessation of lever control, movement the movable member 9 tends to return to the high speeed stage in FIG. 2 under action of the return spring 12, but the retainer 30 engages with an engaging face 21a at a selectively engageable portion corresponding to the desired speed change stage, thereby being retained in the engaging position. If a lever stroke of the lever varies somewhat and stops the retainer 30 between adjacent engaging faces, the return spring 12 acts to prevent the retainer 30 from resting at the intermediate portion by forcing it to move and inevitably reach a proper engaging face 21a corresponding to a desired speed change stage where it is retained in proper position.

Next, the releasing operation of the inner wire 13a which allows the chain guide 11 to return through the action of return spring 12 from the low speed position in FIG. 3 to the high speed position in FIG. 2, will be described.

When the inner wire 13a in the state shown in FIG. 3 is released, the spring 43 acts to swing the control arm 41 clockwise to the limit of its swinging range, whereby the retainer 30 is forced to swing clockwise against the spring 31 and disengage from the engaging face 21a at the engageable portion 21 in engagement with the retainer. The disengagement is performed only at the end of a lever stroke. Hence, the moveable member 9 is kept stationary until the disengagement, and then returns by the action of the return spring 12 after the retainer 30 disengages from the engaging face 21a.

In the swinging motion of the retainer 30, as described, the foremost end thereof moves clockwise along the engaging face 21a and disengages therefrom and then moves counterclockwise along the connecting face 21b. When moving along the engaging face 21a, the retainer 30 keeps the movable member 9 stationary. Hence, the return spring 12, even with a smaller spring force, causes the movable member 9 to rapidly return by means of its stored energy. As a result, noise generated by the contact of the chain with the sprocket as the chain is switched is reduced.

Next, modified embodiments of the invention will be described in accordance with FIGS. 4 through 7.

Figure 4:
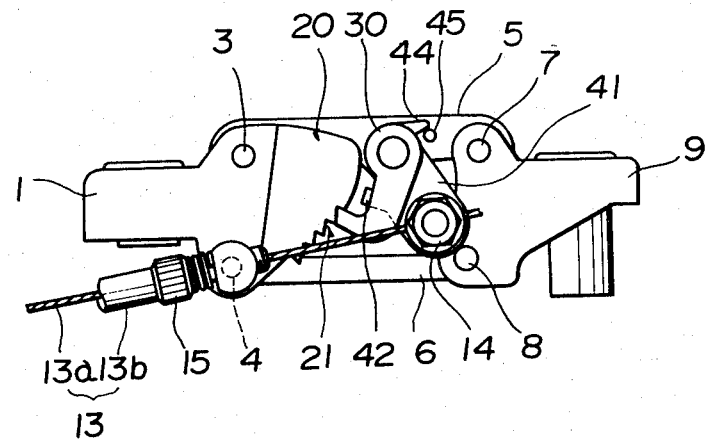

In the embodiment in FIG. 4, the control element 20, which is similar to the control element in the former embodiment, is mounted to the fixing member 1 and the retainer 30 to the linkage member 5.

Figure 5:
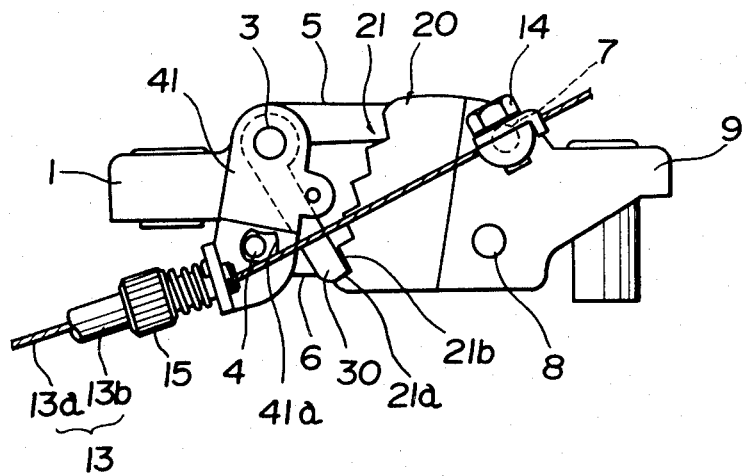
Figure 6:
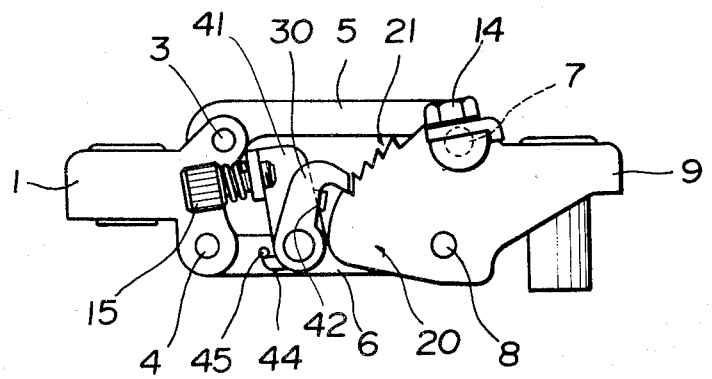
Figure 7:
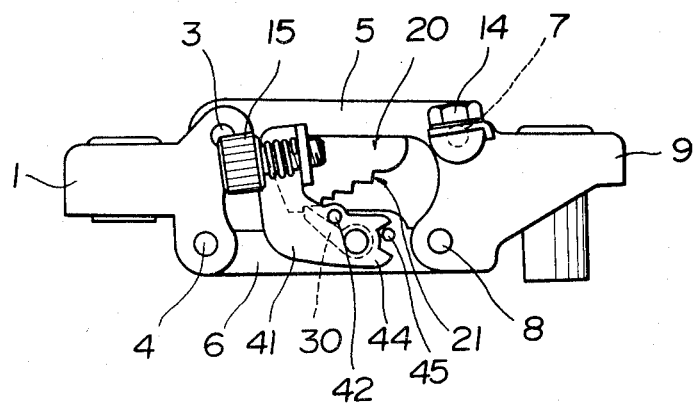

In FIG. 5, the control element 20 is mounted to the movable member 9 and the retainer 30 to the fixing member 1; in FIG. 6, the control element 20 is mounted to the movable member 9 and the retainer 30 to the linkage member 6; and in FIG. 7, the control element 20 is mounted to one of the linkage members 5 and the retainer 30 to the other 6.

The embodiments shown in FIGS. 4 through 7 are basically identical with those in FIGS. 1 through 3 so that the same members are designated with identical reference numerals respectively.

In addition, in FIGS. 4, 6 and 7, reference numeral 44 designates an engaging protrusion provided at the control arm 41. A stopper 45 engageable therewith is provided at the linkage member 6 to thereby control the range of swinging motion of the control arm 41.

The means for moving the retainer 30 employs the control arm 41 in these embodiments, but it may be of different construction. In FIG. 4, the inner wire 13a of control cable 13 is fixed to the control arm 41 and the outer sheath to the fixing member 1, but they may be interchanged with each other.

In addition to these embodiments, another arrangement is possible which the control element 20 is mounted to the linkage member 5 or 6 and the retainer 30 to the fixing member 1 or movable member 9. Since this construction is reverse to those shown in FIGS. 4 and 6, it will be readily understood.

As clearly understood from the above description, the derailleur of the invention utilizes a control element having a plurality of engageable portions which are selectively engaged by a retainer to retain a chain guide in a selected position. The derailleur further includes a moving means for disengaging the retainer from a selected engageable portion, so that when the derailleur movable member returns by means of a return spring, the retainer is moved along the engaging faces of the engageable portions to disengage therefrom, and thereafter, the movable member is allowed to return, whereby a chain guide positioned at the movable member can be properly set in position with respect to a selective one of sprockets for changing the bicycle speed and can be retained in a proper position. Furthermore, the derailleur employs a return spring and is operable by a pull-type cable, and the return spring force is reducible to a value less than the frictional resistance applied to the control lever.

Accordingly, the derailleur of the invention employing the usual pull-type cable is lightly operable as well as being inexpensive; furthermore, even when the chain guide is moved, especially when returned through the return spring, the operation of noise from the contact of the chain with a sprocket can be eliminated.

While preferred embodiments of the invention have been described, such description is for illustrative purposes only, and it is to be understood that changes and variations may be made without departing from the spirit or scope of the invention which is defined in the following claims.

What is claimed is:

1. In a bicycle derailleur comprising four members, a fixing member, two linkage members and a movable member mounting a chain guide, two members of said four members carrying a return spring between them so that the cooperative operation of a control cable comprising an inner wire and an outer sheath and the action of said return spring enables said movable member to reciprocate with respect to said fixing member for changing the bicycle speed, the improvement comprising:

- a control element for setting said movable member in a proper position corresponding to a desired speed change stage, said control element being supported to one of said four members and having a plurality of engageable portions corresponding to the number of speed change stages said movable member reciprocates among for changing the bicycle speed, said engageable portions having engaging faces for each speed change stage and connecting faces for interconnecting said engaging faces;
- a retainer engageable with a said engaging face at each of said engageable portions of said control element for retaining said movable member in a proper position corresponding to a desired speed change stage, said retainer being supported swingably to another member of said four members, said another member being relatively movable with respect to said one member carrying said control element;
- a spring urging said retainer in a first direction where said retainer engages with said engageable portions of said control element; and spring means for moving said retainer in a second direction where said retainer disengages from said engageable portions of said control element, said spring means for moving being provided adjacent said retainer and operable such that when said control wire is operated to allow said return spring to act to return said movable member said means for moving causes said retainer to be disengaged from said engageable portions.

2. A derailleur for a bicycle according to claim 1, wherein said control element is mounted to said fixing member.

3. A derailleur for a bicycle according to claim 2, wherein said retainer is mounted to said movable member.

4. A derailleur for a bicycle according to claim 2, said retainer is mounted to one of said linkage members.

5. A derailleur for a bicycle according to claim 1, wherein said control is mounted to said movable member.

6. A derailleur for a bicycle according to claim 5, wherein said retainer is mounted to said fixing member.

7. A derailleur for a bicycle according to claim 5, wherein said retainer is mounted to one of said linkage members.

8. A derailleur for a bicycle according to claim 1, wherein said control element is mounted to one of said linkage members.

9. A derailleur for a bicycle according to claim 8, wherein said retainer is mounted to said fixing member.

10. A derailleur for a bicycle according to claim 8, wherein said retainer is mounted to said movable member.

11. A derailleur for a bicycle according to claim 8, wherein said retainer is mounted to the other linkage member relatively movable with respect to said one linkage member carrying said control element.

12. A derailleur for a bicycle according to claim 1, wherein said means for moving said retainer includes a control arm, said control arm being mounted to another member relatively movable with respect to said one of four members carrying said control element, being positioned in the vicinity of said retainer, being movable to an extent equal to length of each of said engaging faces, being engaged with said retainer, having a spring urging said retainer in the direction of disengaging from each of said engaging faces, and carrying one of said inner wire and outer sheath of said control cable.

13. A derailleur for a bicycle according to claim 12, wherein said control arm supports said inner wire of said control cable.

14. A derailleur for a bicycle according to claim 12, wherein said control arm supports said outer sheath of said control cable.

15. A derailleur for a bicycle according to claim 12, wherein one of said control arm and said member carrying said control arm is provided with an elongated slot having a length substantially equal to that of engaging face at each of said engageable portions and the other is provided with a pin-like member insertably engageable with said slot.

16. A derailleur for a bicycle according to claim 1, wherein said engageable portions of said control element are formed as ratchet teeth, and said retainer is formed as a pawl in mesh with said ratchet teeth which is pivoted to one of said four members.

17. A derailleur for a bicycle according to claim 16, wherein said engaging face at each of said engageable portions is made coincident with a path of swinging motion of the foremost end of said retainer.

* * * * *